Aug. 3, 1937.          O. W. MUFF          2,088,968
ORIFICE FITTING
Filed Feb. 6, 1935          6 Sheets-Sheet 4
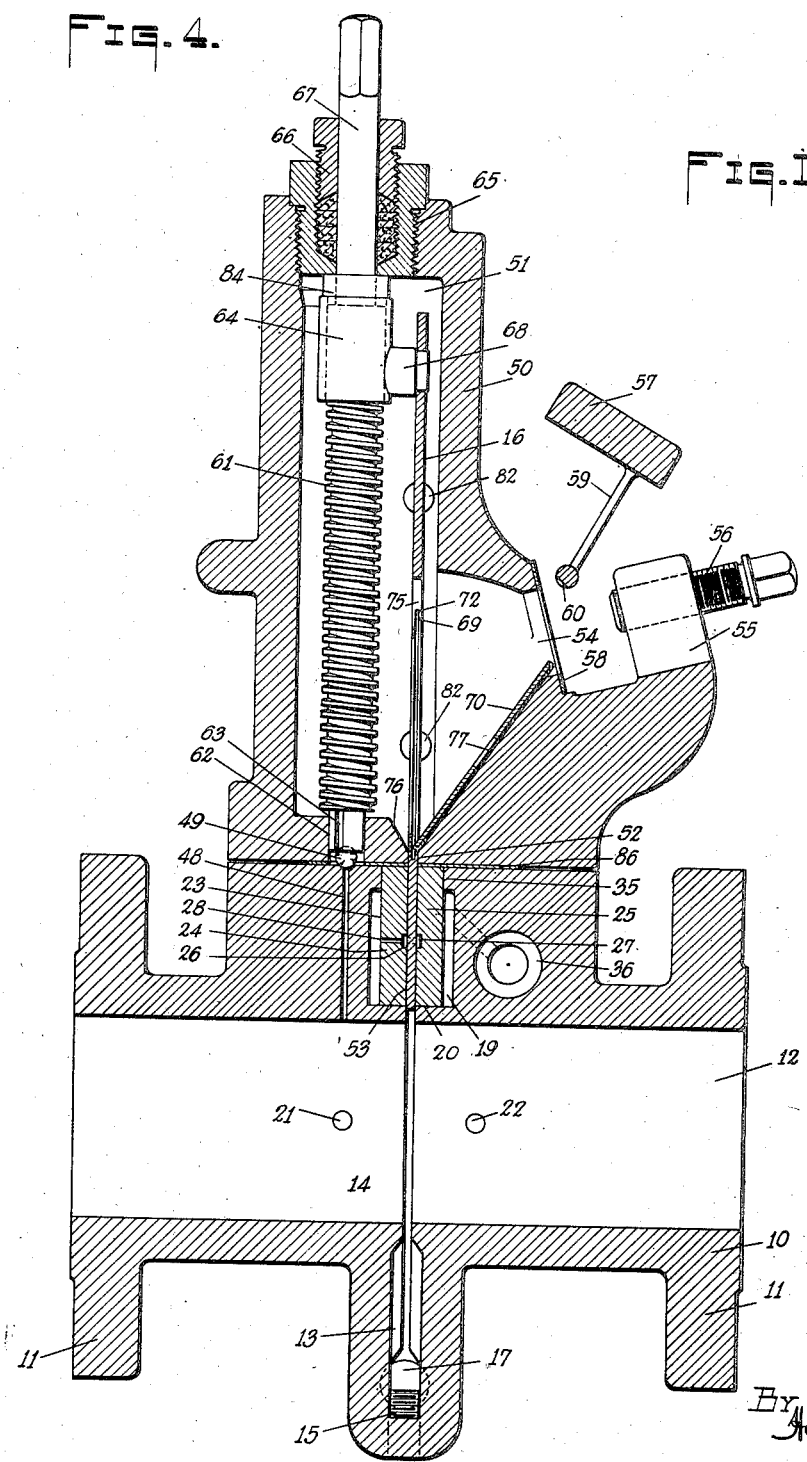
Fig. 4.
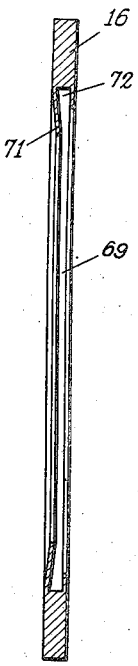
Fig. II.
INVENTOR
O.W. MUFF
By Hazard and Miller
ATTORNEYS.

Aug. 3, 1937.   O. W. MUFF   2,088,968
ORIFICE FITTING
Filed Feb. 6, 1935   6 Sheets-Sheet 5
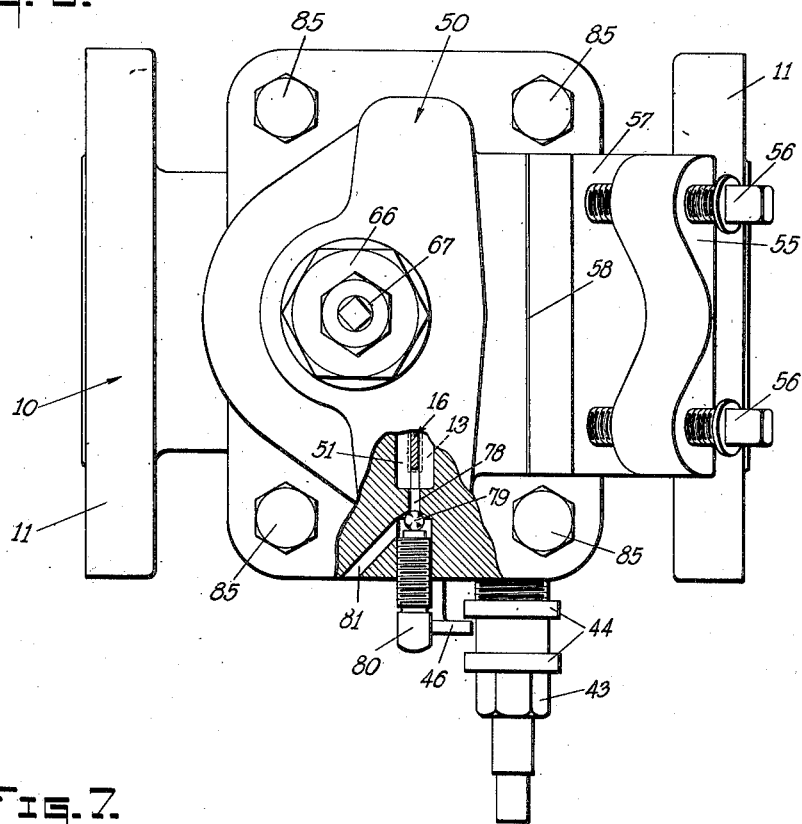
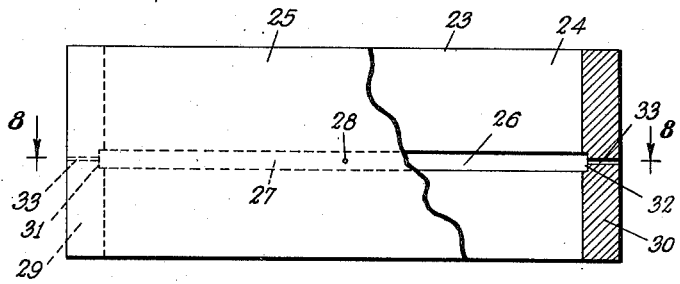
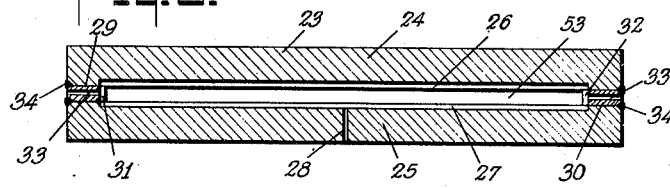
INVENTOR
O. W. MUFF
BY Hazard and Miller
ATTORNEYS.

Aug. 3, 1937.  O. W. MUFF  2,088,968
ORIFICE FITTING
Filed Feb. 6, 1935  6 Sheets-Sheet 6

INVENTOR
O. W. MUFF
BY
Hazard & Miller
ATTORNEYS.

Patented Aug. 3, 1937

2,088,968

UNITED STATES PATENT OFFICE 2,088,968

ORIFICE FITTING

Oliver W. Muff, Los Angeles, Calif., assignor to Commercial Iron Works of Los Angeles, Los Angeles, Calif., a corporation of California Application February 6, 1935, Serial No. 5,230

20 Claims. (Cl. 138—44)

This invention relates to improvements in orifice fittings.

Orifice fittings have heretofore been designed for use in pipe lines conveying gases and liquids for determining the volumetric flow therethrough wherein provision is made for changing the orifice plates so as to vary the size of the orifice in the bore of the fitting as changing conditions in volumetric flow may require.

A common type of fitting which enables substitution of orifice plates employs a laterally accessible chamber with a valve positioned between the bore of the fitting and the chamber so as to be capable of shutting off the bore from the chamber while substitution of plates takes place. These valves have been frequently a source of trouble, particularly in the case of large sized fittings when subjected to high pressures. In such instances, the large valve which exposes a relatively large area to the high pressure in the line would frequently become slightly deformed or distorted because of the pressures thereagainst, resulting in leakage. This leakage created a serious fire hazard if the line was conveying an inflammable gas or liquid.

An object of the present invention is to provide an improved orifice fitting which may be regarded as "valveless" in that no valve, in the sense that the word is commonly used, is employed to shut off the chamber from the bore. At the same time, an effective closure is formed between the chamber and the bore preventing leakage from the bore through the chamber during substitution of plates. In this way the valve difficulties present in prior fittings are entirely eliminated.

More specifically, an object of the invention is to provide an orifice fitting having a carrier which is movable from the chamber into the bore and in a reverse direction, which serves to shift the orifice plate from the chamber to the bore, the orifice fitting being so designed as to enable the formation of a gas-proof seal around the carrier while the carrier is in its upper position during the substitution of orifice plates.

A further object of the invention is to provide an orifice fitting having a carrier which receives an orifice plate, and to so design the carrier as to cause it to firmly seat the plate while in the bore of the fitting so as to prevent leakage around the plate. Specifically, in connection with this object, an object of the invention is to provide a carrier construction having the above mentioned characteristics which will employ the conventional type of orifice plate so that no special orifice plates need be provided for use in connection with the improved fitting.

Another object of the invention is to provide an orifice fitting in which most of the operating parts are formed of stainless steel so as to be capable of resisting corrosion found to exist particularly in pipe lines conveying fluids containing high corrosive substances such as sulphur compounds frequently found in natural gas.

At the present time most stainless or non-corrosive steels are relatively expensive, although a price advantage is to be had in using such steels which are rolled or formed into stock shapes such as sheets, rods and bars.

An object of the present invention is therefore to provide a fitting of such design as to enable the use of stainless or non-corrosive steels in those forms which can be most cheaply purchased.

A further object of the invention is to provide an orifice fitting wherein there is an orifice providing means having parallel sides which slidably fits between the parallel sides of the bisection of the fitting and provide a passage which is spaced from the bisection and which will establish communication between the chamber and the bore, equalizing the pressures in the chamber and the bore when the orifice providing means is in the bore and starts its movement to and from the bore into the chamber. This equalization of pressures in the chamber and the bore is maintained until the orifice providing means has been elevated to its uppermost position where substitution of plates may take place, and while in this position, the passage is automatically and positively closed to prevent leakage from the bore through the chamber.

With the foregoing and other objects in view which will be made manifest in the following detailed description and specifically pointed out in the appended claims, reference is had to the accompanying drawings for an illustrative embodiment of the invention, wherein:

Fig. 4 is a view similar to Fig. 3, the orifice fitting having its parts shown in that position during which substitution of orifice plates can be effected.

Fig. 5 is a top plan view of the orifice fitting, parts being broken away and shown in horizontal section.

Fig. 6 is a horizontal section taken substantially upon the line 6—6 upon Fig. 3 so as to illustrate the bottom part of the body of the fitting in plan and parts therein in section, a portion of this view being broken away and shown in horizontal section.

Fig. 7 is a view in side elevation, parts being broken away and shown in section, illustrating the channel providing member which forms the channel surrounding the carrier permitting a lubricant or gas-proof seal to be formed thereagainst.

Fig. 10 is a partial view in horizontal section on an enlarged scale illustrating the carrier of the fitting with its orifice plate positioned in the bore.

Fig. 11 is a horizontal section through the carrier.

Figure 1:
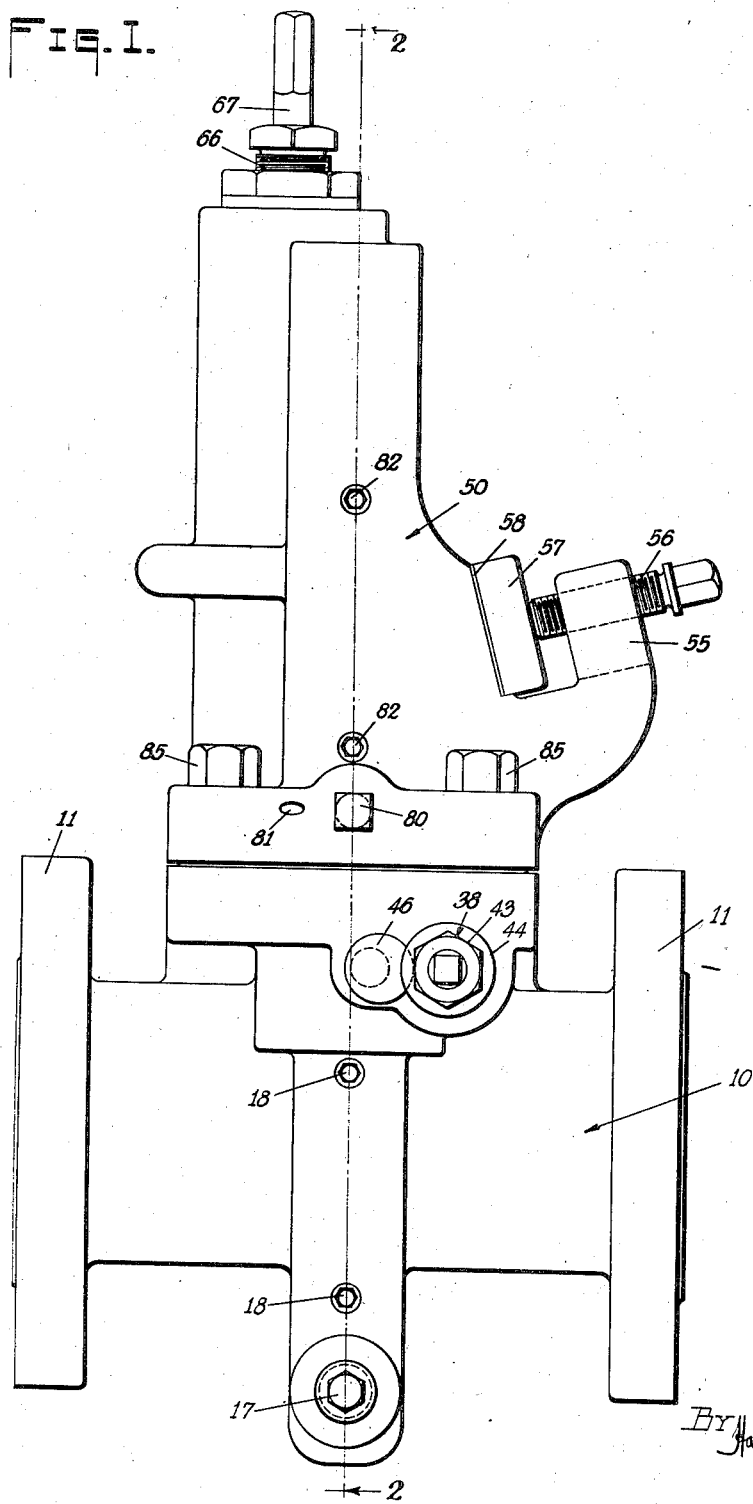
Fig. 1 is a view in side elevation of the improved orifice fitting.
Figure 2:
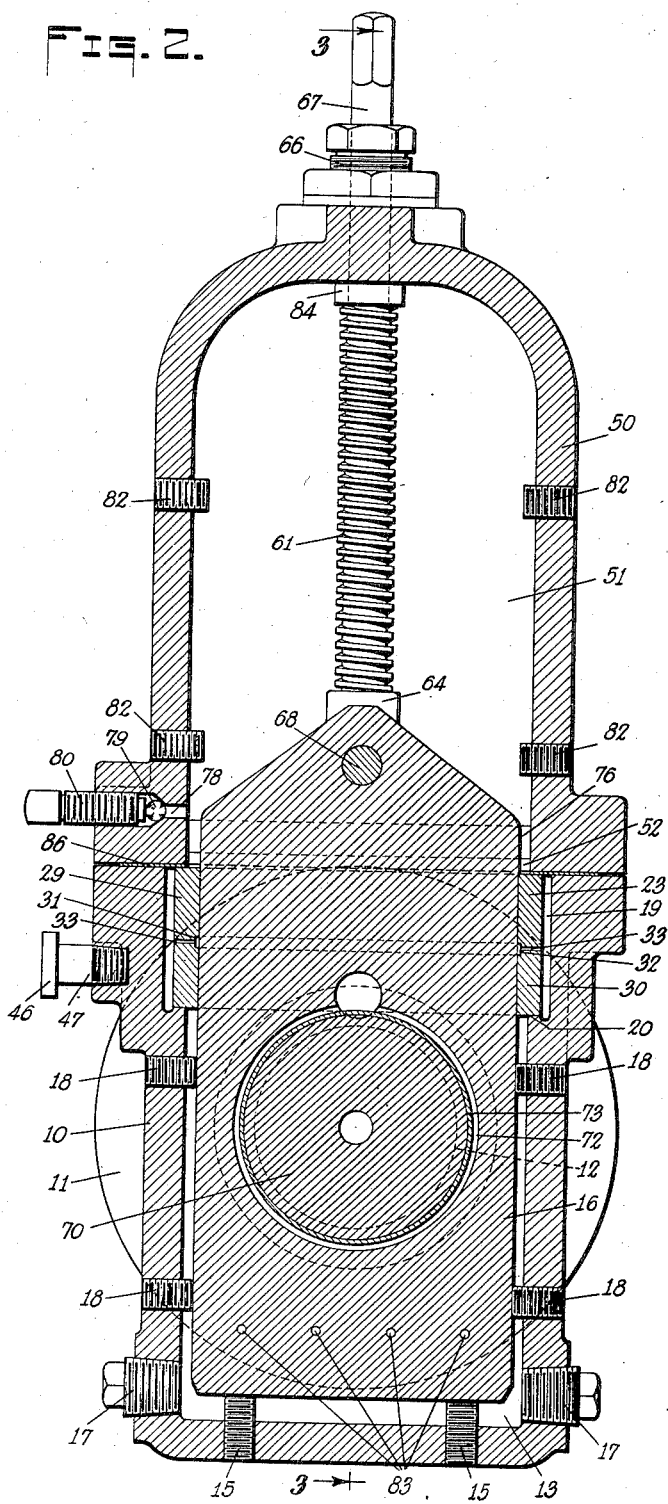
Fig. 2 is a vertical section therethrough taken substantially upon the line 2—2 upon Fig. 1 in the direction indicated.

Referring to the accompanying drawings wherein similar reference characters designate similar parts throughout, the improved fitting consists of a body preferably formed of two principal parts. The lower part is indicated at 10 which is flanged at both ends as indicated at 11 providing for the attachment to flanges on a pipe line (not shown) in which the fitting may be inserted. The body has a longitudinally extending bore 12 formed therein, the internal diameter of which is preferably exactly equal to the internal diameter of the pipe line for which the fitting may be designed. This bore is transversely bisected by what will hereafter be referred to as the "bisection". The bisection is formed by coring an opening 13 in the body part 10 around bore 12 while this part is being cast. An annular slot 14 is machined in the fitting, establishing communication between bore 12 and opening 13. The sides of this slot are machined so as to be parallel, and the slot thus forms the bisection which transversely divides the bore. In the bottom of the lower body part 10 there are screwed studs 15 which form a stop limiting the downward movement of the carrier shown at 16. In the sides of the fitting there may be screwed plugs 17 which serve as clean-out plugs permitting any debris tending to collect in opening 13 to be blown out on removal of these plugs. Studs 18 are screwed into the sides of the lower body part 10 so as to project into the sides of opening 13 and serve as guides for the side edges of carrier 16.

In the top of the lower body part 10, opening 13 is enlarged as indicated at 19 and is of general rectangular contour in plan, as shown on Fig. 6. This enlargement forms shoulders 20 which are machined flat such as by an end mill. The apertures 21 and 22 which are formed in the lower body part 10 on opposite sides of the bisection and which are equally spaced from the bisection are adapted to be connected to a manometer (not shown) which may be of any conventional or preferred type. This manometer, as will be understood by any one familiar with orifice fittings, is for the purpose of measuring the differential in pressure between the up-stream and down-stream sides of the orifice plate which is positioned in bore 12.

Figure 8:
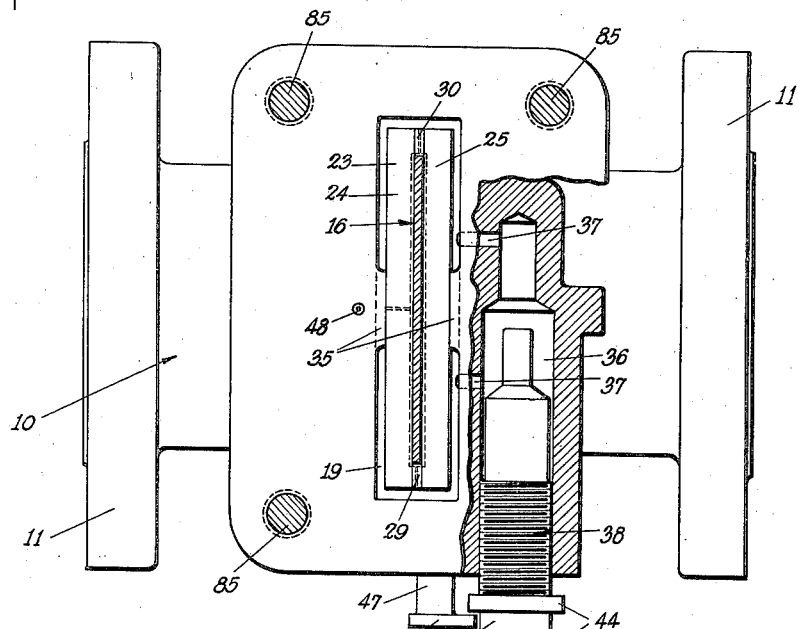
Fig. 8 is a horizontal section taken substantially upon the line 8—8 upon Fig. 7.
Figure 9:
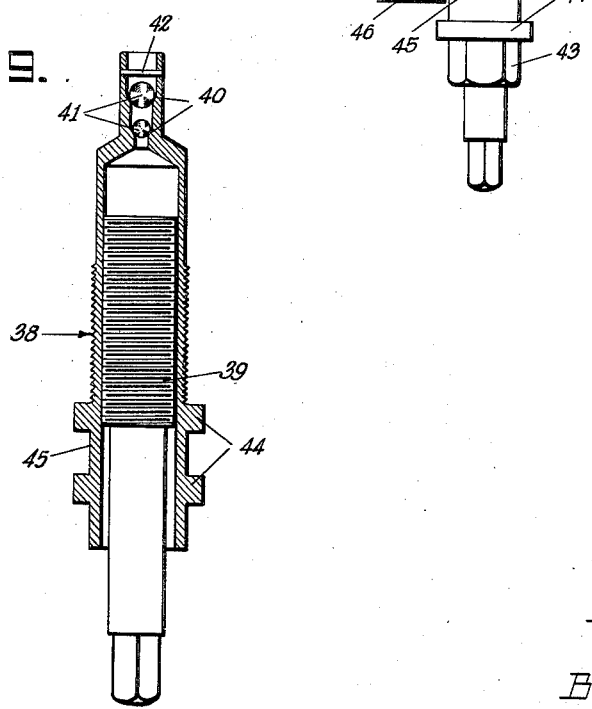
Fig. 9 is a sectional view through the grease gun or injector which forms a part of the improved orifice fitting.

Within the enlarged top 19 of opening 13 there is a channel providing member generally designated at 23. This channel providing member is preferably made of stainless or non-corrosive steel. To this end, two flat bars 24 and 25 (see Fig. 8) are provided, and a longitudinally extending channel 26 and 27 respectively, is cut in the opposed face of each bar. One or more holes 28 are drilled in one of these bars such as bar 25 opposite its channel 27. Spacers 29 and 30 which are also formed of stainless steel and which are of the same thickness as the thickness of carrier 16 have their opposed faces formed with channels 31 and 32 which will be in alignment with channels 26 and 27. These spacers may have holes 33 drilled therein in communication with their respective channels. The bars and spacers are then assembled together as shown at Fig. 8 and are joined by means of welds 34 forming a rectangular box-like structure having a rectangular opening therethrough of the exact size of carrier 16. This channel forming member is positioned in the enlarged top 19 of opening 13 resting flat on shoulders 20 and having its top flush with the top of body part 10. It is held in position in the enlarged top 19 and opening 13 by engagement with the inwardly extending lugs or bosses which project inwardly from the sides as indicated at 35 on Fig. 6. A relatively large hole 36 is drilled in lower body part 10 adjacent the enlarged top 19 of opening 13. This hole communicates therewith by means of passages 37. It is internally threaded to receive the barrel 38 of a grease gun or injector, which in turn is internally threaded to receive a forcing screw 39. Two seats 40 are formed in the end of the barrel for the seating of two ball check valves 41 which are held in place by means of a pin 42. In order to force grease into the enlarged top 19 of opening 13 and cause it to enter channels 26 and 27, 31 and 32, the barrel is filled with grease ahead of the screw 39 and by turning the screw, the grease may be expelled from the barrel into these channels. The pressure capable of being generated in this way is quite high and there are occasions where it is desirable to relieve this grease pressure in the fitting. To this end, the end of the barrel is provided with flats 43 to which a wrench may be applied to back the barrel a short distance out of opening 36. To prevent the unwary operator from backing the barrel entirely out of the opening, the barrel is provided with two annular shoulders 44 defining a groove 45 in which the eccentric head 46 on a screw 47 may be turned. This screw is merely screwed into the side of lower body part 10 and on properly positioning its eccentric head, it loosely enters groove 45 forming a stop limiting the distance to which the barrel may be inadvertently backed off opening 36. Adjacent the bisection, a vertical hole 48 is drilled in the top of body part 10, the top of which is enlarged on the top surface of body part 10, forming a valve seat for a ball 49.

The upper part of the fitting is generally designated at 50. This provides an internal chamber 51 having a slotted bottom at 52 arranged over the opening 53 provided by the channel forming member 23. The chamber 51 has a lateral entrance indicated at 54 providing for ingress and egress of orifice plates. Adjacent this entrance there is an upstanding arm or bracket 55 provided with screws 56 which are engageable with the top of a cover 57 that can be forced home against a gasket 58 by means of the screws.

This cover carries on its underside a T-shaped arm 59, the center of the T being relieved as at 60. An elevator screw 61 extends vertically through the chamber with its abutment fitting in an aperture 62 in the bottom of the upper body part 50. It is vertically grooved as at 63 to permit communication between bore 12 and chamber 51 through hole 48 when ball 49 is not seated. A nut or collar 64 is threaded onto the screw and is adapted to be raised and lowered by the screw upon its rotation. The screw is introduced into the fitting through the flatted opening 65 in the top which is normally closed by means of a stuffing box 66 which prevents leakage around the shank 67. The nut or collar 64 carries an arm 68 from which is suspended the carrier 16. The screw and carrier are likewise preferably formed of stainless or non-corrosive steel, and as the screw may be turned from a rod or bar of non-corrosive steel and the carrier made from plate stock, it will be readily appreciated that these parts are relatively inexpensive.

Figure 3:
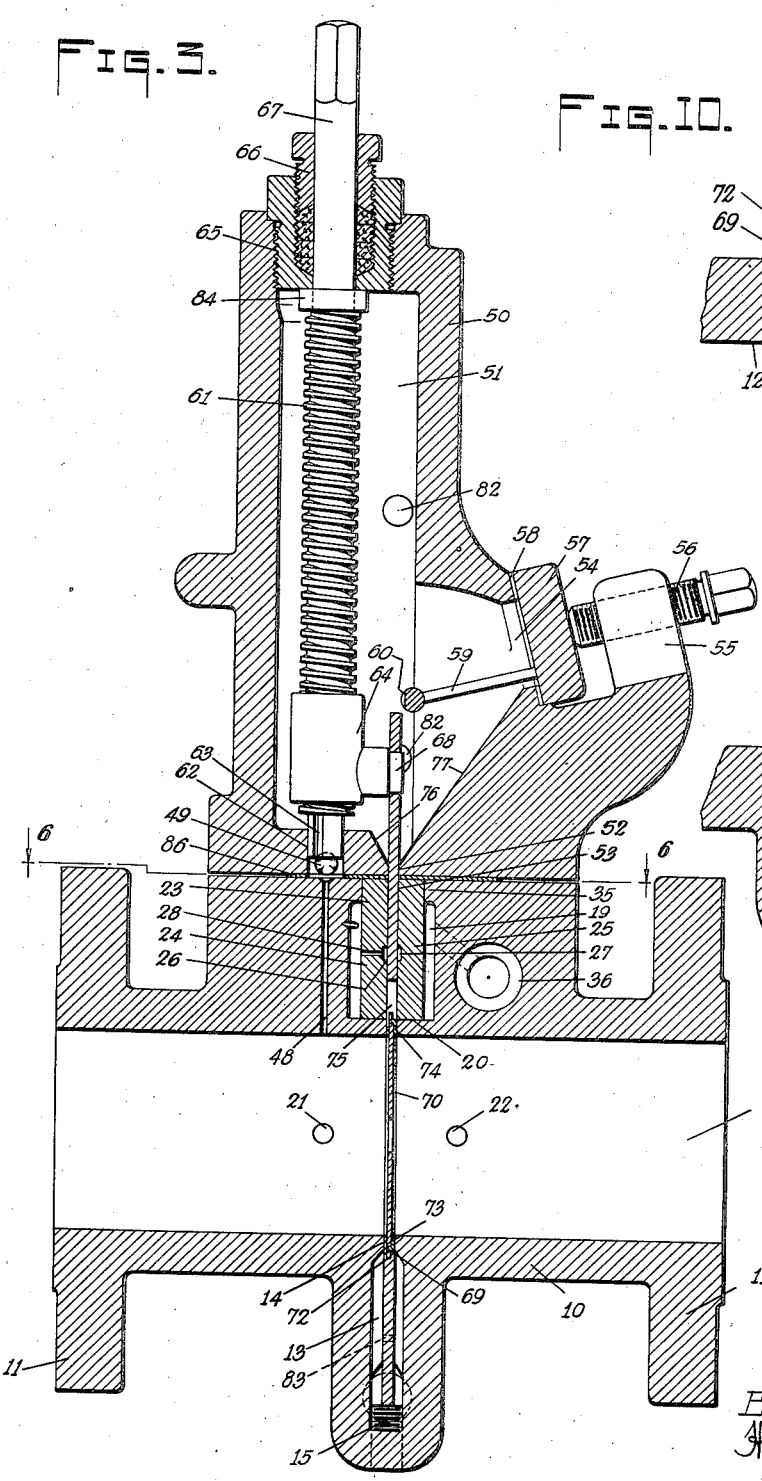
Fig. 3 is a vertical section taken substantially upon the line 3—3 upon Fig. 2 in the direction indicated.

The carrier has a large central opening formed therein indicated at 69. This opening is slightly larger than bore 12 as shown at Fig. 3 so as to be capable of receiving an orifice plate 70 which is also slightly larger than bore 12. On one side of the opening the carrier is formed with an integral inwardly extending flange 71, the internal diameter of which is preferably exactly equal to the internal diameter of bore 12. This flange is sprung or bent inwardly as shown at Fig. 11 so as to normally assume the position shown so that it constitutes a type of annular spring surrounding the opening 69. The opening is preferably grooved or cut back as indicated at 72, to lengthen this flange and increase its flexibility or spring. Then, the right hand side of opening 69 as viewed in Fig. 11 is somewhat larger than the left hand side as defined by flange 71, permitting the insertion of the orifice plate 70 against the spring. The orifice plate in turn, is surrounded by a flange ring 73, the flange of which, indicated at 74, has an internal diameter exactly equal to bore 12. The combined thicknesses of spring 71, orifice plate 70 and flange 74 are preferably exactly equal to the thickness of carrier 16 or substantially so. The top of opening 69 is preferably enlarged to form a finger opening 75, permitting removal of the orifice plate and its ring from the carrier, should occasion require.

The bottom of chamber 51 is preferably formed with downwardly converging sides 76 and 77 which converge downwardly toward slot 52. A hole 78 is drilled in the side of upper body part 50 so as to communicate with chamber 51 adjacent its bottom. This hole is normally closed by a ball 79 held in closed position by means of a screw 80. On backing out the screw, ball 79 may be unseated to permit flow from the chamber through passage 81. By having passage 78 near the bottom of the chamber, any debris or sediment tending to collect in the chamber will have a tendency to be blown out when valve 79 is opened. Studs 82 may be screwed into the sides of the upper body part 50 forming guides for the carrier 16 while in its upper position. The carrier near its bottom has a series of apertures 83 which will be opposite channels 26 and 27 when the carrier is in its uppermost position.

Screw 61 carries a loose collar 84 about shank 67 which fits loosely between the top of the threads on the screw and the bottom of stuffing box 66. This loose fit permits a slight vertical play in the screw to permit the unseating of ball 49.

The upper and lower body parts 50 and 10 respectively, are secured together by means of bolts or cap screws 85 and preferably a gasket 86 is interposed between these parts, which gasket extends over the top of the channel providing member 23.

The operation and advantages of the improved orifice fitting are as follows:

Assuming that the orifice fitting is in the position shown in Fig. 3 and it is desired to change orifice plate 70 to substitute a plate having a differently sized orifice therethrough, the operator applies a suitable wrench to the top of shank 67 of screw 61 so as to rotate the screw. This causes nut 64 to rise, lifting carrier 16. If it is found that the carrier is held too tightly in place by the high pressure of grease surrounding it, it may be necessary to back out barrel 38 of the grease gun so as to relieve the pressure surrounding the carrier, rotation of the screw 61 until nut 64 is elevated into its uppermost position engaging the loose collar 85. This, by reaction, causes the screw to be forced down against ball 49 to seat this ball firmly, closing off passage 48. Chamber 51 is then isolated from the bore by screwing screw 39 forwardly into barrel 38. This expels grease from hole 36 through passages 37 into the enlarged top 19 of opening 13. The grease that is under pressure in the opening enters the channel providing member through apertures 28 and 33, filling channels 26 and 27, 31 and 32, and enters the apertures 83 in the bottom of the carrier. As the carrier snugly fits within the channel providing member 23 and the grease is maintained under pressure in channels completely surrounding it, a gas-proof seal is formed about the carrier itself, isolating chamber 51 from the bore. When the chamber has thus been isolated, the pressure within the chamber is reduced to atmospheric by opening the relief valve, accomplished by backing up screw 80 so as to unseat ball 79. The gas or fluid which may be under high pressure in chamber 51 thus escapes and blows out any sediment tending to collect in the bottom of the chamber. Screws 56 are then backed up so as to loosen cover 57, after which cover 57 can be removed as shown in Fig. 4. The orifice plate 70 and its flanged ring can then be pulled forwardly out of the carrier, and if necessary, the operator may insert his finger or suitable implement through opening 75 to pull the orifice plate forwardly. The orifice plate and its ring may then be removed from the chamber through opening 54 and a new orifice plate having an orifice of different size may then be positioned in the ring. It is then inserted in the chamber through entrance 54 and positioned in the carrier against the flanged branch 71. The cover 57 is then replaced and its T-shaped arm 59 holds the orifice plate in the plane of the carrier, or substantially so. The relief valve 79 is then closed and the fitting is then in position to shift the orifice plate from the chamber into the bore by means of screw 61. At the start of the downward movement of the carrier it may be found that the grease forced into the channel forming member 23 about the carrier has been applied with such great pressure that it is impossible to move the carrier. If this is the case, the grease gun or injector is backed out sufficiently to relieve this pressure.

During the initial downward movement of the carrier, the flanged spring 71 tends to press the orifice plate and its flanged ring out of the carrier. However, the tapered bottom wall 77, on being engaged by the ring 73, causes the ring to press the orifice plate inwardly against the flanged spring 71, overcoming the spring force exerted by the flanged spring. Thereafter, the orifice plate and carrier pass back down through the channel forming member. The downward movement of the carrier continues until stops 15 are encountered and in this position the orifice plate will be accurately centered with respect to bore 12. The flanged spring firmly presses the orifice plate toward the right as viewed in Fig. 3, seating the orifice plate against its flanged ring, and in turn, seating the flanged ring against the side of the bisection, preventing leakage around the orifice plate and causing all flow to pass through the orifice. When the carrier engages the stops, screw 61 is lifted to the top limit of its vertical play, thus raising the screw from the ball and permitting flow into the chamber 51 in the event that pressure in the bore has been unsuccessful to previously lift the screw. Ordinarily, the pressure in the line will be sufficient to lift the screw and to lift ball 49 from its seat as soon as collar 84 is disengaged, so that under normal circumstances, and particularly under high pressures, pressure in the chamber is made equal to that in the bore at the start of the downward movement so as to have balanced pressures effective on the carrier and on the orifice plate during the movement from chamber 51 into bore 12.

During upward and downward movement of the carrier, although the arm 68 on nut 64 may project slightly through the carrier, no interference takes place between the arm and arm 59 by virtue of the relief at 60.

From the above described construction it will be appreciated that the improved orifice fitting may be termed "valveless" in that no conventional form of valve or rotary plug cock is used to oscillate chamber 51 from bore 12. Consequently, the disadvantages attending the use of such valves in these fittings is entirely eliminated. At the same time, a perfect closure is established which is formed by the bottom of the carrier, and a gas-proof seal is formed by maintaining grease or other sealing medium under high pressure around the bottom of the carrier. The improved construction permits of the use of a conventional orifice plate. In other words, no special design of plate is necessary. The plates being merely in the form of flat disks can be cheaply made from stainless or non-corrosive steel obtained in the form of sheet stock. The carrier 16 may also be made from sheet stock and the same is true of ring 73. As the channel providing member 23 and screw 61 can also be cheaply made from the same material it will be appreciated that the important parts of the improved fitting which are most apt to be subject to corrosion can be cheaply made from a corrosion resisting material.

Various changes may be made by those skilled in the art in the details of construction without departing from the spirit or scope of my invention as defined by the appended claims:

I claim:

1. In an orifice fitting, a carrier having an opening therein, an orifice plate receivable wholly within the opening, and spring means urging the plate out of the opening whereby, when the plate is in position in a bisection in the fitting it will be urged laterally against a side of the bisection.

2. In an orifice fitting, a body having a bisected bore, a carrier removable in the bisection, said carrier having an opening therein to receive an orifice plate, an orifice plate of greater size than the bore removably positioned in the carrier so as to be contained wholly within the outline of the carrier, and spring means urging the plate out of the carrier against the side of the bisection.

3. In an orifice fitting, a body having a bisected bore, a carrier movable in the bisection, said carrier having an opening therein to receive an orifice plate, an orifice plate of greater size than the bore removably positioned in the carrier so as to be contained wholly within the outline of the carrier, and spring means carried by the carrier urging the plate out of the carrier against a side of the bisection.

4. In an orifice fitting, a body having a bisected bore, a carrier movable in the bisection, said carrier having an opening therein to receive an orifice plate, an orifice plate of greater size than the bore removably positioned in the carrier, said carrier having an inwardly extending spring flange extending inwardly over the edge of the plate serving to urge the plate laterally against a side of the bisection.

5. In an orifice fitting, a body having a bisected bore, a carrier movable in the bisection, said carrier having an opening therein to receive an orifice plate, an orifice plate of greater size than the bore removably positioned in the carrier, said carrier having an inwardly extending spring flange extending inwardly over the edge of the plate serving to urge the plate laterally against a side of the bisection, and a flanged ring surrounding the plate and interposed between the plate and the side of the bisection against which it is urged.

6. In an orifice fitting, a body providing a transversely bisected bore and a laterally accessible chamber communicating with the bisection, means providing an orifice adapted to be moved from the chamber into the bore through the bisection, there being channels surrounding said means and exposed thereto between the bore and the chamber, and means for supplying the channels with a sealing fluid operable against the orifice providing means to prevent leakage from the bore into the chamber.

7. An orifice fitting comprising a body providing a transversely bisected bore and a laterally accessible chamber, means providing an orifice adapted to be moved from the chamber into the bore and from the bore into the chamber, and means engageable with the sides of the orifice providing means when in the chamber for preventing leakage from the bore into the chamber.

8. An orifice fitting comprising a body providing a transversely bisected bore and a laterally accessible chamber, means providing an orifice adapted to be moved from the chamber into the bore and from the bore into the chamber, and means for forcing a fluid against the sides of the orifice providing means when in the chamber for preventing leakage from the bore into the chamber.

9. An orifice fitting comprising a body providing a transversely bisected bore and a laterally accessible chamber, means providing an orifice adapted to be moved from the chamber into the bore and from the bore into the chamber, a channel providing member in the bisection between the chamber and the bore through which the orifice providing means passes, said channel providing member providing channels which are open to the sides and ends of the orifice providing means, and means for supplying a sealing fluid to said channels.

10. In an orifice fitting, a body providing a transversely bisected bore and a laterally accessible chamber, orifice providing means movable from the chamber into the bore and from the bore into the chamber, said orifice providing means having a sliding fit between the walls of the bisection, and means for opening the chamber to the bore when the orifice providing means is in the bore and closing the chamber from the bore when the orifice providing means is removed into the chamber.

11. In an orifice fitting, a body providing a transversely bisected bore and a laterally accessible chamber, orifice providing means movable from the chamber into the bore and from the bore into the chamber, said orifice providing means having a sliding fit between the walls of the bisection, a screw rotatably mounted in the chamber, a nut on the screw operatively connected to the orifice providing means, there being a passage spaced from the bisection leading from the bore into the chamber, and a valve closure for said passage operable by the screw to be opened when the orifice providing means is in the bore and closed when the orifice providing means is in the chamber.

12. An orifice fitting comprising a body providing a transversely bisected bore and a laterally accessible chamber, a carrier movable from the chamber into the bore and from the bore into the chamber, an orifice plate removably positioned in the carrier, said chamber having an openable outlet in its side through which the orifice plate can be removed or inserted, and means for forcing a sealing fluid into engagement with the carrier when the carrier is in orifice plate changing position to prevent leakage from the bore into the chamber.

13. An orifice fitting comprising a body providing a transversely bisected bore and a laterally accessible chamber, a carrier movable from the chamber into the bore and from the bore into the chamber, an orifice plate removably positioned in the carrier, said chamber having an openable outlet in its side through which the orifice plate can be removed or inserted, a channel providing member in the bisection and through which the orifice plate and carrier pass, said channel providing member providing channels which are exposed to and which surround the carrier, and means for supplying a sealing fluid to the channels so as to be forced against the carrier to seal the chamber from the bore around the carrier during replacement of orifice plates.

14. An orifice fitting comprising a body having a transversely bisected bore and a laterally accessible chamber, a carrier movable from the chamber into the bore and from the bore into the chamber, an orifice plate removably mounted in the carrier, and means for forming a fluid seal between the bore and the chamber and around the carrier while the carrier is in either of its two extreme positions.

15. An orifice fitting comprising a body having a transversely bisected bore and a laterally accessible chamber, a carrier movable from the chamber into the bore and from the bore into the chamber, an orifice plate removably mounted in the carrier, and means for forming a fluid seal between the bore and the chamber and around the carrier while the carrier is in orifice plate changing position.

16. An orifice fitting comprising a body having a transversely bisected bore and a laterally accessible chamber, a carrier movable from the chamber into the bore and from the bore into the chamber, an orifice plate removably mounted in the carrier, and means for forming a fluid seal between the bore and the chamber and around the carrier while the carrier is in the bore.

17. In an orifice fitting having provision for forming a fluid seal, a barrel threaded into the body of the fitting adapted to contain sealing fluid, means for expelling the sealing fluid from the barrel into the body under pressure, check valve means on the barrel preventing reverse flow, and means enabling but limiting unscrewing of the barrel to reduce pressure of the sealing fluid in the body.

18. An orifice fitting comprising means providing a body with a transversely bisected bore and a laterally accessible chamber, a carrier movable from the chamber into the bore and from the bore into the chamber, an orifice plate receivable in the carrier, said carrier carrying spring means serving to normally urge the orifice plate against a side of the bisection when the carrier has been moved into the bore, the chamber presenting walls which converge toward the bore so as to guide the plate and cause it to be forced into the carrier against the action of the spring means during the movement of the carrier from the chamber into the bore.

19. An orifice fitting comprising means providing a body with a transversely bisected bore and a laterally accessible chamber, means providing an orifice movable from the chamber into the bore and from the bore into the chamber, means providing channels between the bore and the chamber surrounding the orifice providing means and exposed thereto, and means for forcing fluid into the channels against the orifice providing means so as to form a fluid seal surrounding the orifice-providing means between the bore and the chamber.

20. An orifice fitting comprising means providing a body with a transversely bisected bore and a laterally accessible chamber, a carrier movable from the chamber into the bore and from the bore into the chamber, an orifice plate removably positioned in the carrier, means providing channels between the bore and the chamber completely surrounding the carrier, and means for forcing a fluid into the channels and against the carrier to which they are exposed to form a fluid seal surrounding the carrier between the bore and the chamber.

OLIVER W. MUFF.